Figure 1:
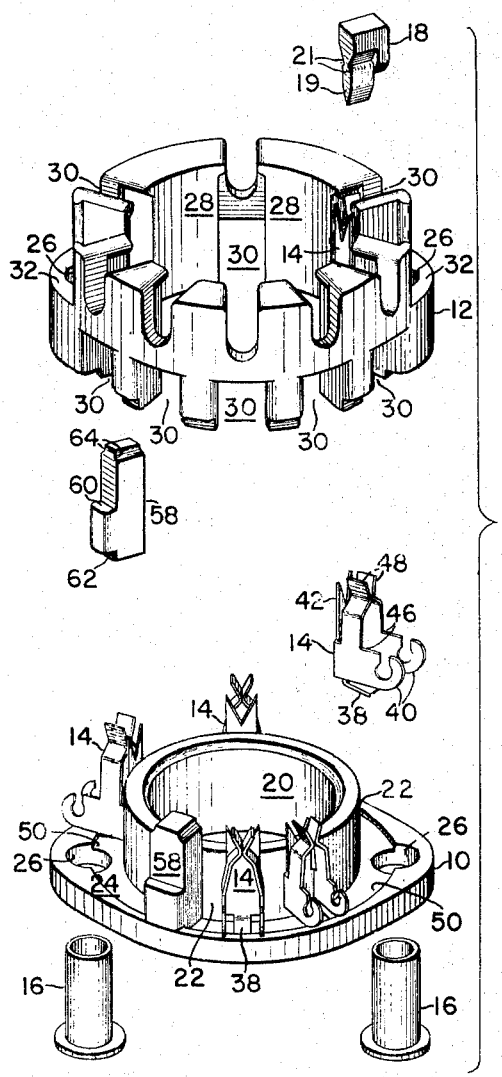

Sept. 19, 1950     R. J. STREB     2,522,907

SOCKET FOR RADIO TUBES

Filed July 31, 1946

Inventor

ROBERT J. STREB

By *Robert T. Killman*
         Attorney

Patented Sept. 19, 1950

2,522,907

UNITED STATES PATENT OFFICE 2,522,907

SOCKET FOR RADIO TUBES

Robert J. Streb, Baltimore County, Md., assignor to Bendix Aviation Corporation, Towson, Md., a corporation of Delaware Application July 31, 1946, Serial No. 687,432

9 Claims. (Cl. 173—328)

This invention relates to sockets for electron discharge tubes, and more particularly to sockets designed to be used as receptacles for tubes known in the art as "acorn" tubes.

Some previously designed tube sockets make no provision for insertion of the large end of the tube through the socket, a feature frequently desirable. Some sockets require that the tube be rotated after insertion into the socket. In installations where the tube must be inserted by holding the small end, rotation of the tube is extremely difficult. Since these tubes are generally used in equipment designed with a minimum of space, any rotation by either end is difficult.

Acorn type tubes present a variety of differences in the relative positioning of the contact pins so that alignment to tolerance must be met by the tube socket. Some sockets provide vertical alignment and alignment in the arc or angular difference between the pins, but horizontal movement of the tube is not checked and no provision is made for variance in radius or the difference in diameters of the glass envelopes. Defining the point at which the socket clip contacts the tube pin is of importance in the high frequencies with which the tube must operate.

Some sockets are assembled by riveting or screwing the tube-gripping contacts to their insulating foundation. Such procedure is tedious and expensive. Such a variety of operations multiplies the chances of accidental damage to the several small parts in which case the whole socket must be discarded because of the damage of one part.

An object of this invention is to provide a tube socket for an "acorn" type vaccum tube, or other like electric device, in which the contact clips which grip the tube terminals are conveniently and quickly mounted without rivets or screws.

Another object of this invention is to provide a tube socket for an "acorn" type vacuum tube, or other like electric device, which permits easy replacement of any one of the several contact clips without the need for discarding the rest of the socket.

Still another object of this invention is to provide a tube socket for an "acorn" type vacuum tube, or other like electric device, whose several parts can be manufactured at minimum expense.

A further object of this invention is to provide a tube socket for an "acorn" type vacuum tube, or other like electric device, which provides a choice of angular tube orientation with respect to the tube socket and the previously established chassis mounting holes.

Another object of this invention is to provide a tube socket for an "acorn" type vacuum tube, or other like electric device, in which the tube may be mounted with either end inserted through the socket.

Still another object of this invention is to provide a tube socket for an "acorn" type vacuum tube, or other like electric device, in which tubes with more than one set number of radial pins can be used and which provides easy blocking of the unused terminal contacts so that any chosen tube must be inserted in the socket as prescribed in its circuit design.

A further object of this invention is to provide a tube socket for an "acorn" type vacuum tube, or other like electric device, which aligns itself to all variations within tolerance of the dimensions of the tube and relative positions of the tube contact pins so that firm electrical and mechanical contact is maintained at a definite point on the tube pins adjacent to the glass envelope of the tube.

The present invention eliminates all holes in both metal and insulating foundation, except for chassis mounting holes. The need to bore cross holes or to form them by cross cores in a mold is eliminated.

Choice of position of the tube within the socket is possible since more than the usual number of needed pin contacts are available. To prevent improper insertion of a given tube, small insulating plugs are provided, the insertion of which in unused contacts prevents their use, leaving but one possible way to insert the tube.

Alignment to the variety of tube dimensions is accomplished by a tolerable movement of the contact clips within their individual housings. To prevent horizontal movement of the tube after insertion and to define the point of contact on each tube pin, a small spring extension at the base of each socket contactor maintains a tension toward the center of the tube and keeps the contacts as near as possible to the point where the tube pin leaves the glass envelope.

Figure 2:
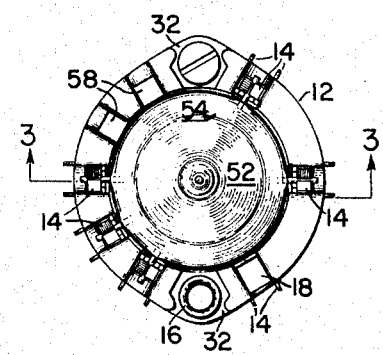
Figure 3:
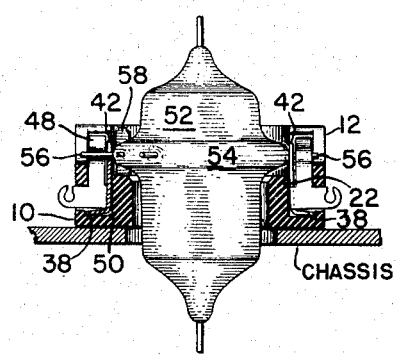

Other objects and advantages of the invention will become apparent from a consideration of the following specification when taken in conjunction with the accompanying drawing, in which Figure 1 is an exploded view of a socket embodying the invention, showing the relation of the several parts to each other;

Figure 2 is a top view of the assembled socket with an "acorn" type vacuum tube in operating position; and, Figure 3 is a side elevation, in section, of the assembled socket, showing a vacuum tube in place therein, the section being taken along the line 3—3 of Figure 2.

Considering Figure 1 the component parts of the socket are: a base 10 of insulating material suitable in strength, a top ring 12 of like material, a plurality of identical contact clips 14 of metal having good spring tension and preferably coated for good surface conductivity (some contacts are omitted from Figure 1 for clarity of illustration), eyelets 16 of workable and corrosion resisting metal such as brass, and plugs 18 of desired number and preferably of the same material as base 10 and ring 12.

The base 10 comprises a flat plate 24 having formed integrally therewith a centrally located cylindrical member 22. The base is formed with a bore 20 coaxial with the member 22 and of diameter large enough to receive either end of an "acorn" type vacuum tube, or of size consistent with any other size tube or electrical device of like design with which the socket is desired to be used. The base plate is formed with two or more mounting holes 26. The outer periphery of member 22 forms the inner support for all contact clips 14 and the plate 24 provides the under support for said clips.

The top ring 12 is formed with outer dimensions coinciding with those of plate 24 of the base 10 and with an inner surface 28 of diameter sufficient to receive member 22 of base 10. Coincident with holes 26, holes of like diameter pass through ring 12, providing a means by which the parts of the socket may be bound together and mounted on a chassis or unit support. Spaced at arcs of 30° and 60°, consistent with the positioning of acorn tube contacts, are recesses 30 which receive the spring contacts 14 and establish the upper, outer, and side limits of movement for each contact clip. Each such recess 30, together with plate 24 and member 22, provides a complete housing which retains a contact clip 14. The recesses 30 penetrate the upper, inner and lower peripheries of the ring as slots and extend through to its outer periphery in the upper and lower portions thereof, leaving the central portion of the ring to form a continuous band bounding the outer side of the central portion of each recess. The width of the recess is restricted where it penetrates the upper periphery and the upper portion of the outer periphery of the ring, thus forming shoulders in those portions, which limit movement of the enclosed clips. The upper portion of the ring is cut away in the vicinity of the mounting holes to provide re-entrant portions 32, thus reducing the necessary length of the fastening means employed.

The contact clips 14 may each be formed from a single sheet of resilient material. The clip comprises a flat, rectangular, central portion 42, terminated in its upper end in a V-shaped notch. Side portions 46 are bent to parallelism at right angles to the lower part of central portion 42, their free extremities 40 being slotted for convenience in making soldered connections thereto.

Extending upwardly from the side portions 46 are resilient tabs 48, each bent to a V-shape with the apexes of the V's in touching relationship, the apexes being located just above the apex of the V-shaped notch in the central portion 42, whereby a tube pin pressed downwardly past the touching portions of the tabs 48 will be resiliently held against the apex of the V-shaped notch in portion 42.

The upper surface of the base plate 24 is recessed to form a shallow annular depression 50 surrounding the base of the cylindrical member 22. Extending from the bottom edge of the central portion 42 of each contact clip is a tongue 38. The tongue is bent to an angle approaching 100° with respect to the portion 42, with its free end extending somewhat below the side portions 46 for a purpose to be described.

In assembling the socket, the clips are positioned on the upper surface of the base plate 24 with their central portions 42 resting against the outer periphery of the cylindrical member 22. The tongues 38 are of such length that they rest against the outer edge of the depression 50. The respective heights of the cylindrical member 22 and the clip portions 42 are such that the apexes of the notches in the portions 42 are above the member 22. The clips are positioned to coincide with the slots 30 in the ring 12.

Upon assembly and mounting, the ring 12, the base 10 and the clips 14 take up relative positions as indicated in Figure 3. A tube 52, having a pin-holding rim 54 and contact pins 56, is shown in place in the socket.

It will be noted that the free ends of the tongues 38 pressing against the lower and outer peripheries of the depression 50 tend to press the upper ends of the clip portions 42 against the cylindrical member 22. The diameter of the outer periphery of the member 22, being slightly less than that of the pin holding rim 54 of the tube 52, the clip portions 42 are pressed against the pin holding rim. The tongues 38 press the clips upward to the limit set by the recesses 30, but allow a certain amount of downward and radial movement within the recesses, which are dimensioned for this purpose. The recesses are also dimensioned to allow a certain amount of lateral movement of the clips to accommodate angular irregularities in tube pin orientation.

The socket elements may be held in assembled relation by the use of hollow rivets or eyelets 16, as shown in Figure 1, the rivets extending through the holes 26 and the matching holes in the ring 12. Mounting on a support may then be accomplished by screws or bolts extending through the rivets.

In order to adapt the socket for use with a variety of tubes or devices of similar character and to allow a desirable latitude in the orientation of connections to suit the requirements of different installations, a greater number of recesses than required for any tube may be provided. In order to prevent mistakes in the insertion of the tube, the recesses not needed for a particular installation may be filled by plugs such as shown in the upper portion of Figure 1. The plug, designated 18, is shaped to fill the upper part of the recess and to rest upon the bottom of the slot which terminates the upper portion of the recess in the outer periphery of the ring 12. The plug is provided with an elongated, depending extension 19, the lateral faces of which are provided with V-shaped notches 21. The tip of the extension is wedge-shaped. When the plug is inserted in a recess, the tip of the extension separates the tabs 48 of the clip contained therein and the plug comes to rest with the indented portions of the tabs in the notches 21. Thus, while the plug may be readily inserted and removed, it is resiliently retained in place against accidental removal. In some cases it may be desirable that certain socket recesses be rendered unavailable for use without disassembly of the socket. Such cases arise where sockets are manufactured or assembled for use with a particular tube or for a particular purpose and it is desired that unskilled users in the field be unable to shift plugs at will.

For such circumstances plugs may be provided which may be inserted from beneath the top ring 12 during assembly and which are so formed that they are retained by the walls of the recess against removal once the socket is assembled. Such a plug is shown at 58 in Figure 1. It is shaped to fit any of the recesses 30 and is formed with shouldered portions at 60, 62 and 64, which cooperate with the uninterrupted central portion of the ring 12, the annular depression 50 in the base 24, and the restricted upper termination of the recess 30, respectively, to retain the plug in the recess.

While the disclosure of the invention has been restricted to the embodiments now preferred, many variations of form and arrangement, falling within the scope of the invention as defined by the appended claims, will occur to those skilled in the art. The invention should, therefore, not be considered as limited to the embodiments disclosed herein.

What is claimed is:

1. A socket for a radio tube or the like, comprising an annular base member having a flat plate portion and a cylindrical portion located centrally thereof, said plate portion being formed with annular depression surrounding the base of said cylindrical portion, a ring member superimposed on said base member and secured thereto, said cylindrical portion of said base member being positioned within said ring member, said ring member being formed with recesses opening onto said cylindrical portion and said plate portion of said base member and extending through the upper periphery of said ring member, a contact clip positioned in each of said recesses and being retained in said socket solely by the coaction therewith of the portions of the ring member forming the boundaries of said recesses and the surfaces of said base member onto which said recesses open, contact pin receiving means forming a portion of each of said clips and adapted to resiliently retain such a pin in contact with a portion of said clip located adjacent said cylindrical portion of said base member, and a resilient member formed on each of said clips and cooperating with said depression in said base member to urge the upper portion of said clip against said cylindrical member.

2. A socket for a radio tube or the like, said socket being of annular shape and being formed with a plurality of recesses; a contact clip housed in each of said recesses, each of said recesses being so formed as to admit a contact pin of a radio tube extending radially with respect to the axis of said socket when said pin is translated along a direction parallel to said axis, and each of said contact clips being so constructed as to resiliently grip and retain such a pin when so translated to a selected position, and means for rendering any of said recesses and its respective clip unavailable for the reception of a contact pin, said means comprising a plug dimensioned to fill at least a portion of one of said recesses, said plug comprising a portion dimensioned to be received by said respective clip, and to be resiliently retained thereby when said plug is positioned to fill said recess.

3. A socket for a radio tube or the like, said socket being of annular shape and being formed with a plurality of contact pin receiving recesses, a contact pin retaining clip positioned in each of said recesses; and means rendering any desired one of said recesses unavailable for the reception of a contact pin, said means comprising a plug dimensioned to be received by any one of said recesses and when so received to be resiliently retained by said clip positioned therein.

4. A socket for a radio tube or the like, comprising an annular base member having a flat plate portion and a cylindrical portion located centrally thereof, said plate portion being formed with annular depression surrounding the base of said cylindrical portion, a ring member superimposed on said base member and secured thereto, said cylindrical portion of said base member being positioned within said ring member, said ring member being formed with recesses opening onto said cylindrical portion and said plate portion of said base member and extending through the upper periphery of said ring member, a contact clip positioned in each of said recesses and being retained in said socket solely by the coaction therewith of the portions of the ring member forming the boundaries of said recesses and the surfaces of said base member onto which said recesses open, contact pin receiving means forming a portion of each of said clips and adapted to resiliently retain such a pin in contact with a portion of said clip located adjacent said cylindrical portion of said base member, and resilient means urging the upper portion of each of said clips against said cylindrical member.

5. A socket for a radio tube or the like, said socket being of annular shape and being formed with a plurality of recesses adapted for the reception of contact pin retaining clips, and means rendering any desired one of said recesses unavailable for the reception of a contact pin, said means comprising a plug dimensioned to be received in any one of said recesses and means retaining said plug in said recess when so received.

6. A socket for a radio tube or the like, comprising a base member having a flat plate portion and a cylindrical portion located centrally thereof; a ring member superimposed on said base member and secured thereto, said cylindrical portion of said base member being positioned within said ring member, said ring member being formed with contact pin receiving recesses opening onto said cylindrical portion and said plate portion of said base member and extending through the upper periphery of said ring member, and a plug positioned in one of said recesses, said recesses and said plug being so shaped that said plug is retained in said one of said recesses against removal when said ring member and said base member are secured together.

7. A socket for a radio tube or the like, comprising a base member, a ring member, said members being secured together, said ring member being formed with contact pin receiving recesses opening onto said base member and extending through the upper periphery of said ring member, and a plug positioned in one of said recesses, and rendering it unavailable for the reception of a contact pin, said recesses and said plug being so shaped that said plug is retained in said one of said recesses against removal, when said ring member and said base member are secured together.

8. A socket for a radio tube or the like, comprising a pair of members secured together, one of said members being formed with contact pin receiving recesses opening on the other of said members, and a plug positioned in one of said recesses and rendering it unavailable for the reception of a contact pin, said recesses and said plug being so shaped that said plug is retained in said one of said recesses against removal, when said members are secured together.

9. A socket for a radio tube or the like, comprising an annular member, said member being formed with a plurality of contact pin receiving recesses, said recesses opening in a plurality of the faces of said member, a plug positioned in one of said recesses and rendering it unavailable for the reception of a contact pin, said plug and said recesses being so shaped that said plug is removable only through one of said faces, and means closing the openings of said recesses into said one of said faces.

ROBERT J. STREB.

REFERENCES CITED

The following references are of record in the file of this patent:

UNITED STATES PATENTS

| Number | Name | Date |
|---|---|---|
| 2,027,730 | Hirmann | Jan. 14, 1936 |
| 2,321,469 | Draving | June 8, 1943 |
| 2,376,625 | Schmitt | May 22, 1945 |

FOREIGN PATENTS

| Number | Country | Date |
|---|---|---|
| 523,866 | Great Britain | July 24, 1940 |
| 109,872 | Austria | Feb. 20, 1940 |